July 25, 1933.  A. S. KNAPP  1,919,560
WAFFLE IRON ASSEMBLY
Filed March 5, 1932
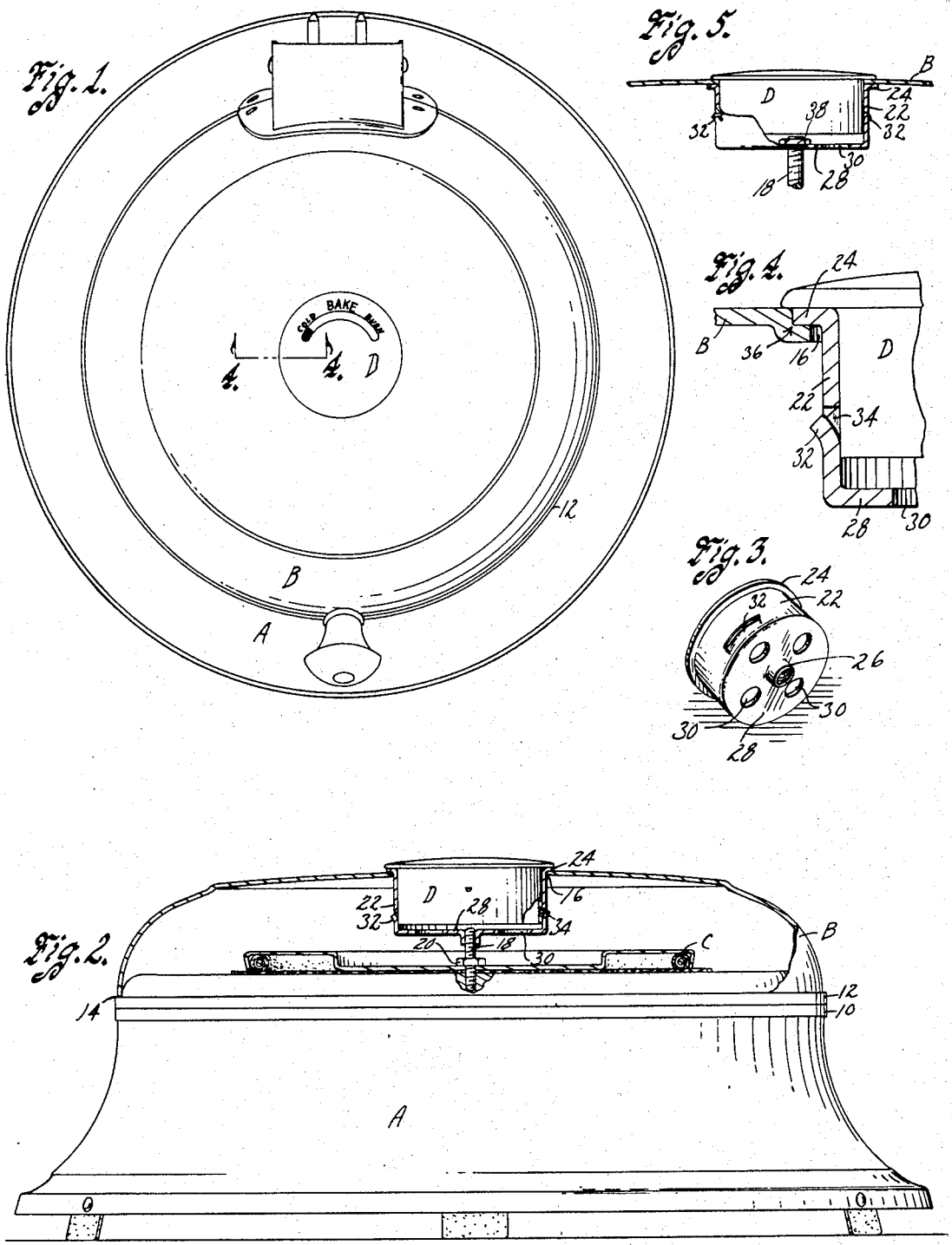

Patented July 25, 1933

1,919,560

UNITED STATES PATENT OFFICE

ANDREW S. KNAPP, OF BELLEVILLE, ILLINOIS, ASSIGNOR TO KNAPP-MONARCH COMPANY, OF BELLEVILLE, ILLINOIS, A CORPORATION OF MISSOURI

WAFFLE IRON ASSEMBLY

Application filed March 5, 1932. Serial No. 597,079.

The object of my invention is to provide a waffle iron assembly of simple, durable and comparatively inexpensive construction.

More particularly, it is my object to provide a construction whereby the waffle iron grid may be secured to the shell or casing of the waffle iron quickly and easily, and yet in substantial fashion.

A further object is to provide a means of connection between the waffle iron grid and casing that will afford a means for mounting a heat indicator within the shell of the waffle iron.

Still a further object is to provide as a means of connection between a grid and a shell of a cooking utensil a cup-like element adapted to have threaded connection with a shank mounted on the grid and which when the parts are assembled are held against movement relative to each other, a hat indicator or other signaling device may be mounted and retained within one element forming a part of the connection between the grid and casing.

With these and other objects in view my invention consists in the construction, arrangement and combination of the various parts of my device, whereby the objects contemplated are attained, as hereinafter more fully set forth, pointed out in the claims, and illustrated in the accompanying drawing, in which:—

Figure 1 is a top plan view of my waffle iron assembly, illustrating the arrangement of the indicator.

Figure 2 is a sectional view through the upper portion of the waffle iron, illustrating the means of connection between the grid and the casing.

Figure 3 is a perspective view illustrating the cup-like element or nut forming one part of the means of connection.

Figure 4 is a detail sectional view taken on the line 4—4 of Figure 1, illustrating a slightly modified form of device; and Figure 5 is a detail sectional view of still another modified form.

In the accompanying drawing I have used the reference character A to indicate the base, casing, or shell of a waffle iron. Mounted upon the base A is a grid 10. The grid 10 may be of any style used for cooking purposes, or may be of the kind ordinarily employed for baking waffles.

An upper shell or casing B is arranged and it in turn has a grid 12 secured adjacent its botton edge. The grid 12 is arranged with a shoulder 14 against which the lower marginal edge of the shell B rests. Placed upon the upper surface of the grid 12 is an electrical heating assembly C. The heating element is of any suitable kind and is held in position by means of the connection between the shell and the grid in the manner hereinafter to be more fully described.

In the shell or casing B there is provided a central opening 16. The purpose of the opening 16 is to receive the means of connection between the grid 12 and the casing B as well as to support an indicator. It is desirable that the indicator be positioned substantially at a center point relative to the outline of the waffle iron casing.

Threadedly connected with the grid 12 and projecting upwardly therefrom is a screw threaded shank 18. The screw threaded shank or element 18 projects through a portion of the electrical heating unit C and into the grid 12 as clearly shown in Figure 2 of the drawing.

A nut 20 holds the heating element unit C in position relative to the grid 12.

I provide a cup-like member 22 which is provided with an outturned marginal flange 24. The cup-like member 22 is arranged with a screw threaded hub 26 which coacts with the upper end of the screw threaded shank 18. The body of the cup-like member 22 projects downwardly through the opening 16 in the casing B with the marginal outturned flange 24 resting and overhanging the material adjacent the opening 16 of the casing B.

By rotating the cup-like member 22 the grid 12, due to its connection with the screw threaded shank 18, is drawn tightly against the outer lower edge of the casing B and at the same time the casing B is held relative to the grid 12.

The bottom 28 of the cup-like member 22 may be provided with a plurality of openings 30 which serve two purposes. When the parts are being assembled a forked member or wrench may be inserted into any two of the openings 30 and thus the cup-like member 22 may be rotated and operated as a nut relative to the screw threaded shank 18.

A heat indicator or other signaling device D may be snapped or otherwise positioned within the cup-like member 22. In the drawing I have illustrated one embodiment wherein the cup-like member 22 is provided with an outstruck portion 32 which engages an outstruck projection 34 carried by the indicator D. The indicator D includes a marginal upper flange which projects over the flange 24 of the cup-like member 22.

The openings 30 permit heat from the grid 12 to circulate in and around the underside of the indicator D and thus its operation is quite positive and sensitive. The indicator D is of any suitable kind and consists of mechanism directly responsive to temperature for its operation.

When the indicator D is in position as shown in Figure 2 it serves as a sealing means or as a safety against further operation of the means of connection between the grid and the casing B. The cup-like member serves as a nut with a recess therein to receive the indicator D.

In Figure 4 I have shown a downturned shouldered rim 36 adjacent the opening 16 in the casing B. In this case the cup-like element 22 has its outturned flange 24 received within the shouldered rim 36, so that only the upper portion of the indicator D projects above the upper surface of the casing B.

I have shown the downturned shouldered rim as a modification and as capable of one embodiment of my invention.

In Figure 5 I have illustrated the cup-like member 22 as being received against the underside of the casing B and being secured thereto by means of the flange 24 engaging the casing B and secured thereto by spot welding or any other suitable fashion.

In this case the screw threaded shank 18 projects through an opening in the bottom of the cup-like member 22 and a nut 38 is employed for the connection between the casing B and the shank 18 secured to the grid 12. In this case the indicator D is received within the cup-like member 22 in substantially the same manner as illustrated in Figure 2 of the drawing.

The advantage of my device resides in the fact that a single means of connection is used for assembling the casing relative to the grid, and at the same time a part of the means of connection serves to receive the indicator and provides a convenient way of retaining the indicator in proper position as part of the waffle iron assembly.

In the embodiment of my invention as illustrated in the accompanying drawing I have endeavored to show one complete form of means of connection that is simple, durable and which lends itself to ease of assembly and yet which is substantial in all respects.

While I have referred to my device as a waffle iron assembly, it will of course be understood that the same assembly can be used in connection with other cooking utensils such as sandwich toasting devices and the like where it is desired to connect a grid to a casing and at the same time have an indicator or signaling device thereon.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. A cooking utensil assembly including a casing element having its bottom open and an opening centrally arranged in its top, a cooking grid for the open bottom of said casing, a threaded member secured to said grid and projecting upwardly therefrom, a cup-like member received in said central opening and having threads for connection with said threaded member and portions for engaging said casing whereby to retain said casing and said grid assembly relative to each other, and a self-contained, unitary indicator mounted wholly within said cup-like element.

2. A cooking utensil assembly including a casing element having its bottom open and an opening centrally arranged in its top, a cooking grid for the open bottom of said casing, a threaded member secured to said grid and projecting upwardly therefrom, a cup-like member projecting downwardly from said central opening and having means of connection with said threaded member and portions for engaging said casing whereby to retain said casing and said grid assembly relative to each other, and an indicator unit mounted in said cup-like element, said cup-like container having a perforation in the bottom thereof to permit ready transmission of heat from said cooking grid to said indicator unit.

3. A cooking device assembly including a casing element having a central opening in its top, a grid engaging said casing adjacent its bottom, a screw threaded shank secured to said grid, a recessed nut extending into said casing through said central opening having portions engaging and overhanging the material of the casing surrounding said central opening and screw threadedly connected with said shank, and an indicator unit having an indicating face, said unit being mounted in said recessed nut with said face covering the nut.

ANDREW S. KNAPP.